Sept. 23, 1952     J. A. BERRIMAN ET AL     2,611,740
DISTILLATION OF FURFURAL
Filed Jan. 3, 1949
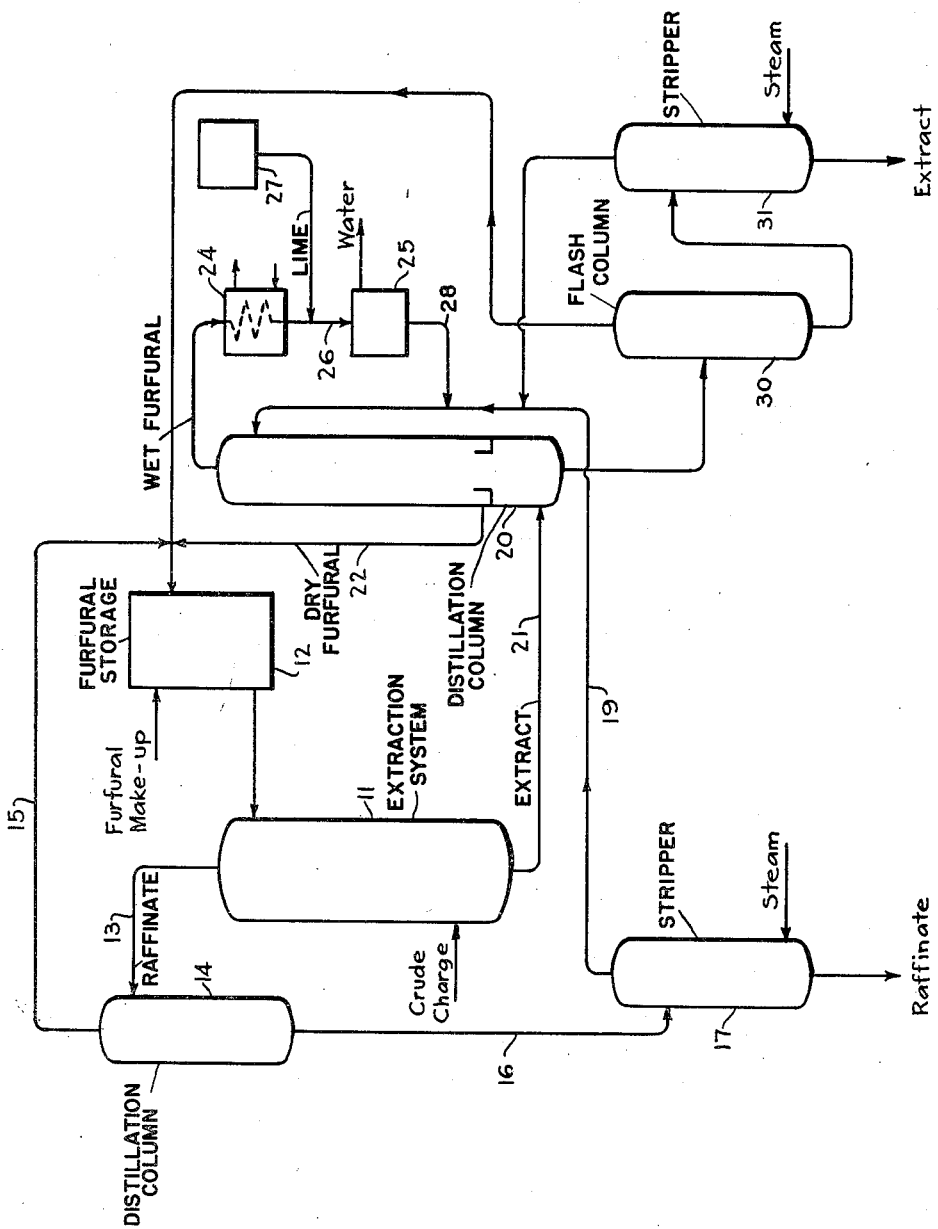
Inventors:
John Alexander Berriman
James Chalmers Selbie
By:
Their Agent *John H. Colvin*

Patented Sept. 23, 1952

2,611,740

UNITED STATES PATENT OFFICE 2,611,740

DISTILLATION OF FURFURAL

John Alexander Berriman, Corringham, and James Chalmers Selbie, Upminster, England, assignors to Shell Development Company, San Francisco, Calif., a corporation of Delaware Application January 3, 1949, Serial No. 68,924
In Great Britain August 18, 1948

10 Claims. (Cl. 202—71)

This invention relates to improvements in solvent extraction and recovery systems wherein the solvent is furfural. More particularly, it is concerned with a method of minimizing corrosion of equipment and loss of furfural in a solvent extraction process.

The use of furfural as an extractive solvent for the separation of mixtures of organic compounds is well known and widely used, both in liquid-liquid and in vapor-liquid extraction processes. Thus, for example, extraction with furfural is employed to separate the aromatic and unsaturated components from petroleum hydrocarbon mixtures of the lubricating oil range and so improve their oxidation and viscosity characteristics. In such processes the recovery of furfural assumes as great an importance as the actual extraction step itself, since normally the cost of the furfural is high and even small percentage losses of furfural may seriously affect the economy of the process as a whole. The conventional method of recovering furfural in those cases where the extracted material has a higher boiling point than furfural is to distill the furfural from the extracted material. This distillation normally takes place in the presence of water, and it is therefore a frequent practice to effect the distillation recovery of furfural in a column producing two streams of furfural, a dry stream which can be returned to the extraction system and a wet stream from which the water phase has to be separated before the furfural is returned to the extraction step of the system. Alternatively, however, the furfural may be recovered in a single stream from which the water phase is separated before the furfural returns to the extraction system.

The use of furfural in such processes has hitherto often been accompanied by certain undesirable features, the most important of which are loss of furfural due to decomposition, polymerization and oxidation, with resulting corrosion of the equipment utilized in the process by these products of furfural degradation. Moreover these degradation products of furfural may tend to form coke which, if allowed to accumulate, could eventually block various parts of the equipment such as heat exchanger and other tubes and distillation columns and trays. Since furfural is expensive in relation to the mixtures undergoing extraction and therefore comparatively small furfural losses may affect disproportionately the cost of the process, and since plant corrosion can also involve heavy cost in replacements, maintenance and shut-down of plant, it becomes a matter of considerable importance to eliminate or minimize these undesirable features.

It is therefore an object of this invention to provide an improved process for the solvent extraction of mixtures of organic compounds utilizing furfural as selective solvent. A further object is to minimize the corrosion of equipment utilized in such extraction processes, including equipment utilized in the recovery of the furfural for further use. Another object is to reduce the loss of furfural in such solvent extraction processes. Other objects and advantages will become apparent to those skilled in the art from the detailed description of the invention.

The exact nature of all of the causes of the development of corrosiveness in furfural during use in extraction processes with their accompanying recovery operations for the furfural are not fully known and understood at the present time. However, there is evidence which indicates that some of the furfural becomes converted to acids and that this development of acidity may account for the corrosion problems which arise and also to some extent for the loss of furfural by decomposition, since the thermal decomposition of furfural is catalyzed by acids. Whether or not the origin of these undesirable features is accurately identified in this way, a satisfactory remedy is not readily at hand.

Neutralization of any acidity by conventional means such as the addition of acid neutralizing compounds, for instance hydroxides or carbonates of the alkali metals or alkaline earth metals, to the circulating furfural is inadvisable. In the presence of such compounds furfural either polymerizes or undergoes other auto-condensation reactions such as the Cannizzaro reaction. Neutralization by means of weaker bases such as organic amines has been proposed and utilized with some success, but these bases will themselves react with furfural forming complex reaction products with resulting loss of furfural. In general it can be said that in employing such conventional neutralization methods local excesses of the acid neutralizing compound are inevitable and since at a pH greater than 7 furfural polymerizes rapidly, attempts to neutralize acidity in circulating furfural by such means often result in some increase rather than decrease in the furfural loss.

A method has now been found whereby any acidity which may develop in solvent extraction and recovery systems employing furfural as the solvent can be effectively neutralized, and any losses of furfural through decomposition or other chemical conversion minimized without involving the objectionable features already indicated.

According to the present invention a method is provided for minimizing corrosion of equipment and loss of furfural in a solvent extraction and recovery system wherein a mixture of organic compounds is subjected to an extraction step by contact with furfural, and wherein furfural is recovered from the extract by a distillation in the presence of water and separation of a water phase from wet furfural distillate or from the wet part of the distillate, which method comprises injecting an acid neutralizing agent which is an inorganic alkaline compound and preferably an alkali or alkaline earth metal basic compound or mixtures thereof, such as an oxide, hydroxide, carbonate or bicarbonate of an alkali or alkaline earth metal, into the said wet distillate or the said wet part of the distillate prior to the separation of a water phase therefrom, in such quantity that the pH of the separated water phase is greater than 5 but not greater than 7.

The acid neutralizing agent may be a single compound or a mixture of compounds of the defined type. For example, it may comprise sodium or potassium hydroxide, sodium or potassium carbonate or bicarbonate or lime or slaked lime or any combination of these. It may be injected into the wet furfural in solid form, but preferably in the form of an aqueous dispersion (aqueous solution and/or aqueous slurry) of the neutralizing agent. Injection may be continuous or by means of periodic doses, but in either case it must be carefully controlled so that the pH of the water phase leaving the vessel in which the subsequent separation of the water and furfural phases takes place lies within the range specified above and preferably lies as close to pH 7 as possible.

The merits of the present invention lie largely in the following features all of which tend to minimize any possibility of alkali catalyzed reactions of furfural such as polymer formation or the Cannizzaro reaction taking place:

(1) The acid neutralizing agents now used are added at such a place in the system that they are in contact with the furfural for a minimum of time.

(2) The acid neutralizing agents are added to the furfural where it is coolest and are not present in those parts of the system where the furfural is at a high temperature.

(3) The acid neutralizing agents are added at a point where any excess of them and where the products of the neutralizing reaction are immediately removed from the system in the separated water phase.

(4) In those systems wherein the furfural distillate consists of two streams, a dry one and a wet one, the acid neutralizing agents are added only to the wet stream with the result that only a fraction of the circulating furfural comes into contact with the acid neutralizing agents in each passage through the system.

(5) The control of the addition of the acid neutralizing agent is based not on the acidity of the furfural in the system but on the acidity of the water phase separating out from the wet distillate. Owing to slightly incomplete acid transfer from the furfural phase to the water phase, the furfural phase is a little more acidic than the separated water phase and consequently there is some safeguard against exceeding a pH 7 value for the returning furfural.

The invention may be illustrated by reference to the accompanying drawing, which is made a part of this specification, and which shows diagrammatically one embodiment of the invention.

The drawing is a flow sheet of a plant for the solvent extraction of petroleum lubricating oil fractions wherein the aromatic and unsaturated hydrocarbons are removed from the oil by means of extraction with furfural and the furfural recovered from the extract by distillation and returned to the system.

The extraction system is represented by 11, wherein crude petroleum lubricating oil fractions are treated countercurrently with furfural flowing from the furfural storage vessel 12. The extraction system may be of any conventional type and since the particular type employed is not relevant to the invention this is not shown in detail. The resulting raffinate which contains furfural is led by line 13 to a distillation column 14, where the bulk of the furfural content is removed by distillation and returned by line 15 to the furfural storage vessel 12. The resulting partially stripped raffinate then flows through line 16 to distillation column 17, where the last traces of furfural are removed by steam stripping. The finished raffinate, which is the desired product, flows from column 17 to storage or to such other finishing treatments as may be necessary, and the distillate from column 17, a mixture of water and furfural, flows by means of line 19 into the reflux stream to distillation column 20.

The extract phase from the extraction system 11, which consists of furfural and the undesirable aromatic and unsaturated bodies from the charge stock flows through line 21 and a suitable heater (not shown) to the distillation column 20 where furfural is distilled off together with any water present. The column 20 is so arranged that furfural refluxes and collects substantially dry on tray 7 from the bottom from where it flows, by means of line 22, to the furfural storage vessel 12. Wet furfural passes from the top of column 20 to the condenser 24 and the condensed mixture of furfural and water (condensed wet furfural) flows to the separator 25 through line 26 into which line is fed a continuous stream of a slurry of slaked lime (calcium hydroxide) in water (0.05 pound of slaked lime per gallon of water) from the dosing tank 27. The rate of flow of the slurry into line 26 is so controlled that the pH of the water phase separating in and leaving the separator 25 is within the range 5 to 7 and preferably as close to pH 7 as possible. The furfural leaving the separator 25 flows through line 28 and back to the top of column 20. The aqueous phase leaving the separator 25 is treated for the recovery of the small percentage of the furfural it contains and when this furfural has been removed, the water passes to waste. If desired a further cooler may be inserted between the condenser 24 and the separator 25, either before or after the point of mixture with the lime slurry.

The extract solution which collects in the base of column 20 may flow, if desired, via a heater to a pressure flash column 30 where further furfural is removed which eventually flows to the furfural storage vessel 12 and the extract from the foot of column 30 flows to the distillation column 31 where the last traces of furfural are removed by steam stripping. The distillate from column 31, a mixture of water and furfural, flows into the reflux stream to column 20.

When operating a process such as has been described above for every hundred tons of furfural going into the extraction system only about 30 tons come into contact with the acid neutralizing agent employed, and this only for the short period of time taken in passing through line 26 to separator 25; this contacting is effected while the condensed water and furfural are still in an intimate state of mixing. Thus the danger of polymerization or other alkali catalyzed reactions taking place is reduced to a minimum.

The following facts taken from actual plant operation illustrate the important advantages accruing from the practice of the present invention. With the aid of the technique of the present invention it has been found possible in refining to produce high viscosity index lubricating oil using furfural as extraction solvent, to extend indefinitely the period between plant stoppage due to plant corrosion or plant obstruction by furfural degradation products. The average acidity of the circulating furfural was reduced from about 0.09% (calculated as acetic acid) to about 0.003% and the loss of furfural was reduced from 0.095% of the total furfural turnover to 0.03% of this same turnover, a reduction in the loss of furfural of about 70% of the original loss when the process was practiced without the application of the present invention.

Although the invention has been described above with particular reference to the solvent refining of mineral lubricating oils, it will be readily understood that it is not so limited in its applications. On the contrary, it will be clear to those familiar with the art to which this invention pertains that the invention is applicable to any process wherein furfural is employed as an extractant and subsequently recovered by distillation in the presence of water. This water may be present owing to deliberate addition thereof to the system or by its adventitious occurrence therein. The subsequent recovery of the furfural from the extract by distillation in the presence of water may be applied to extracts obtained in extractive distillations as well as in liquid-liquid solvent extractions as described already hereinbefore. In the case of extractive distillation, wherein the extracted material in the extract is, for the most part, of a lower boiling point than the furfural solvent, the extracted material is first separated from the solvent by distilling off said extracted material; but, then it is usually necessary from time to time, or substantially continuously from a sidestream portion of the recovered solvent, to separate the solvent from accumulated higher boiling materials, including products of degradation and condensation or polymerization, often by a steam distillation of the furfural from such higher boiling materials.

The following may be cited as further instances of specific processes to which the invention is applicable: the use of furfural for the extraction of impurities from crude anthracene or anthraquinone; the use of furfural for the extraction of impurities, particularly nitrogen-containing impurities, from animal or vegetable oils or fats; the use of furfural for the purification of rosin; and the use of furfural for the separation of mixtures of glyceride oils of varying degrees of unsaturation.

We claim as our invention:

1. In a method for the recovery of furfural from mixtures of furfural with higher boiling organic compounds wherein the furfural is distilled in the presence of water from said organic compounds, the improvement which comprises: (1) distilling said mixture in a distillation zone in the presence of water into an overhead product consisting essentially of vapors of water and furfural, a bottoms product containing said higher boiling organic compounds with a reduced content of furfural and an intermediate product consisting essentially of substantially dry furfural, and withdrawing the same from the distillation zone; (2) at least partially condensing the separated overhead vapor product after withdrawal from the distillation zone and injecting thereinto an inorganic alkaline compound as an acidic neutralizing agent, prior to stratification of separate water and furfural liquid phases, in such quantity that the pH of subsequently resulting stratified water phase is greater than five but not greater than seven; (3) stratifying and immediately separating resulting liquid aqueous and furfural phases; and (4) returning the separated furfural as condensate reflux to the distillation zone.

2. A method according to claim 1, wherein the acid neutralizing agent is an aqueous dispersion of an alkaline earth metal alkaline compound.

3. A method according to claim 1, wherein the acid neutralizing agent is an aqueous dispersion of an alkali metal alkaline compound.

4. In a method for the recovery of furfural from mixtures of furfural with higher boiling organic compounds resulting from the solvent extraction of petroleum oil fractions by said furfural wherein the furfural is separated by distillation in the presence of water from said organic compounds, the improvement which comprises: (1) distilling said mixture in the presence of water in an upright distilling zone while maintaining condensate reflux in at least an upper section of the distilling zone, and producing an overhead vapor product consisting essentially of vapors of water and furfural, a bottoms product which is withdrawn therefrom containing the organic compounds with a reduced content of furfural and a substantially dry liquid furfural condensate in an intermediate section of said distilling zone and withdrawing same therefrom; (2) at least partially condensing the overhead vapor product after withdrawal from the distilling zone and injecting thereinto an inorganic alkaline compound as acid-neutralizing agent, prior to stratification of separate water and furfural liquid phases, in such quantity that the pH of subsequently resulting stratified water phase is greater than 5 but not greater than 7; (3) stratifying and immediately separating resulting liquid aqueous and furfural phases; and (4) returning the separated furfural as condensate reflux to the upper section of the distilling zone.

5. A method according to claim 4, wherein the mixture of organic compounds constitutes an extract from a petroleum lubricating oil fraction.

6. A method according to claim 4, wherein the mixture of organic compounds constitutes an extract from a petroleum lubricating oil fraction and the acid-neutralizing agent is an aqueous dispersion of calcium hydroxide.

7. A method according to claim 4, wherein the acid-neutralizing agent is an aqueous dispersion of an alkaline earth metal alkaline compound.

8. A method according to claim 4, wherein the acid-neutralizing agent is an aqueous dispersion of an alkali metal alkaline compound.

9. In a method for the recovery of furfural from mixtures of furfural with higher boiling organic compounds extracted by said furfural from petroleum lubricating oil stocks wherein the furfural is separated by distillation in the presence of water from said extracted organic compounds; the improvement which comprises: (1) separating said mixture by distillation in an extended upright distillation zone in the presence of condensate reflux and in the presence of water into three fractions: an overhead vapor product consisting essentially of vapors of water and furfural; a bottoms product which is withdrawn therefrom containing the petroleum oil extract components with a reduced content of furfural, and an intermediate liquid product consisting essentially of substantially dry liquid furfural which is withdrawn as such from an intermediate point of said distilling zone; (2) at least partially condensing the separated overhead vapor product after withdrawal from the distillation zone and injecting thereinto an inorganic alkaline compound as acid-neutralizing agent, prior to stratification of separate water and furfural liquid phases, in such quantity that the pH of subsequently stratified water phase is greater than 5 but not greater than 7; (3) stratifying and immediately separating resulting liquid aqueous and furfural phases; and (4) returning the separated furfural as condensate reflux to the upper section of the distilling zone.

10. The method according to claim 9, wherein the inorganic alkaline compound acid-neutralizing agent is an aqueous dispersion of calcium hydroxide.

JOHN ALEXANDER BERRIMAN.
JAMES CHALMERS SELBIE.

REFERENCES CITED

The following references are of record in the file of this patent:

UNITED STATES PATENTS

| Number | Name | Date |
| --- | --- | --- |
| 2,312,912 | Kiersted | Mar. 2, 1943 |
| 2,404,253 | Scarth | July 16, 1946 |
| 2,409,781 | Mertz | Oct. 22, 1946 |
| 2,416,500 | Scarth | Feb. 25, 1947 |
| 2,419,039 | Scarth | Apr. 15, 1947 |
| 2,442,474 | Scarth | June 1, 1948 |